(12) United States Patent
Dohi et al.

(10) Patent No.: US 9,767,534 B2
(45) Date of Patent: Sep. 19, 2017

(54) DEVICE, PROGRAM AND METHOD FOR DISPLAYING SITUATION

(71) Applicant: Furuno Electric Co., Ltd., Nishinomiya (JP)

(72) Inventors: Osamu Dohi, Nishinomiya (JP); Kazuki Tsujimoto, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 0 days.

(21) Appl. No.: 14/198,909

(22) Filed: Mar. 6, 2014

(65) Prior Publication Data

US 2014/0253597 A1   Sep. 11, 2014

(30) Foreign Application Priority Data

Mar. 7, 2013   (JP) .................................. 2013-046005

(51) Int. Cl.
*G06T 3/60* (2006.01)
*G01W 1/02* (2006.01)
*G01C 21/20* (2006.01)

(52) U.S. Cl.
CPC .............. *G06T 3/60* (2013.01); *G01C 21/203* (2013.01); *G01W 1/02* (2013.01); *Y02T 70/745* (2013.01)

(58) Field of Classification Search
CPC ....................................................... G06T 3/60
See application file for complete search history.

(56) References Cited

U.S. PATENT DOCUMENTS

| 7,516,011 | B1 | 4/2009 | Kabel et al. |
| 8,296,001 | B1 | 10/2012 | Kabel et al. |
| 2005/0278113 | A1* | 12/2005 | Maruyama ....... G08G 1/096783 701/436 |
| 2006/0004496 | A1* | 1/2006 | Tucker ................... G01C 23/00 701/4 |

(Continued)

FOREIGN PATENT DOCUMENTS

| JP | H05240963 A | 9/1993 |
| JP | 2004258020 A | 9/2004 |

OTHER PUBLICATIONS

European Patent Office, Extended European Search Report of EP14156970.7, Jun. 23, 2014, 11 pages.

*Primary Examiner* — Kee M Tung
*Assistant Examiner* — Grace Q Li
(74) *Attorney, Agent, or Firm* — Alleman Hall Creasman & Tuttle LLP (57) ABSTRACT

A situation display device is provided. The device includes: an observation data acquiring module configured to acquire observation data, and information of observed locations of the observation data; a data selecting module configured to select the observation data within a predetermined range from a course of the device; and a display unit configured to display a location of the device on a bottom side of a display screen, and display the course linearly such that its traveling direction extends upward from the bottom side. The display unit displays, a predetermined area in an upward tapering shape, and displays the selected observation data at a position that indicates a relation between the course and the observed location, the displayed position of the device in the perpendicular direction being corresponding to an offset of the location of the device from the course.

9 Claims, 4 Drawing Sheets

(56) References Cited

U.S. PATENT DOCUMENTS

| | | | |
|---|---|---|---|
| 2007/0048084 A1* | 3/2007 | Jung | G09F 9/30 |
| | | | 404/9 |
| 2009/0259349 A1* | 10/2009 | Golenski | G08G 1/205 |
| | | | 701/2 |
| 2010/0240988 A1* | 9/2010 | Varga | G02B 27/017 |
| | | | 600/425 |
| 2011/0298638 A1* | 12/2011 | Groeneweg | G08G 1/096775 |
| | | | 340/905 |
| 2012/0150436 A1* | 6/2012 | Rossano | G01C 21/3694 |
| | | | 701/450 |

* cited by examiner

DEVICE, PROGRAM AND METHOD FOR DISPLAYING SITUATION

CROSS-REFERENCE TO RELATED APPLICATION(S)

This application claims priority under 35 U.S.C. §119 to Japanese Patent Application No. 2013-046005, which was filed on Mar. 7, 2013, the entire disclosure of which is hereby incorporated by reference.

TECHNICAL FIELD

The present invention generally relates to a situation display device which acquires and displays observation data obtained by observing at least one of meteorological and hydrographic phenomena.

BACKGROUND OF THE INVENTION

Conventionally, a method has been known, which performs positioning of a movable body by using GPS satellites (GNSS satellites) and then receives a correcting signal from a known reference station and corrects the positioning result to obtain a position of the movable body with higher accuracy. This method is generally called a differential GPS (differential GNSS).

In Japan, the differential GPS (hereinafter, may be abbreviated to DGPS) for ships has been operated by Japan Coast Guard. Specifically, a number of DGPS reference stations have been installed domestically to cover coastal sea areas of Japan, and each reference station performs positioning by receiving radio waves from GPS satellites. Since the latitude and the longitude of each reference station is known in advance, a GPS positioning error is calculated based on the positioning result, and the error is broadcasted from the DGPS reference station as correcting information (DGPS beacon). A navigation apparatus equipped in a ship and including a DGPS beacon receiver receives the result of the positioning performed by the GPS and corrects the result based on the correcting information received by the DGPS beacon receiver.

Such a DGPS beacon transmits data according to RTCM-104 which is a standard defined by Radio Technical Commission for Maritime Service. A format called type 16 for transmitting a special message is set for RTCM-104. Currently in Japan, a service in which meteorological information and hydrographic information observed at predetermined observed locations (e.g., beacons) close to DGPS reference stations are transmitted as a type 16 message of the DGPS beacon is in operation (meteorological and hydrographic report). Thus, information regarding meteorological and hydrographic phenomena which is important in traveling can be provided to an operator.

In this regard, JP2004-258020A discloses a configuration in which meteorological and hydrographic information is acquired by analyzing the special message written in type 16 of the DGPS correcting information, and the meteorological and hydrographic information from the respective observed locations and a location of the ship are displayed on an electronic chart display and information system in the form of wind arrows and the like. Thus, in JP2004-258020A, the relation of the meteorological and hydrographic information from each observed location with the ship becomes obvious, and therefore, the meteorological and hydrographic information from each observed location can be grasped comprehensively.

Moreover, JP1993-240963A discloses a marine meteorological change situation display device which, although does not acquire meteorological and hydrographic information broadcasted by the DGPS beacon, acquires a weather map by facsimile and displays a track of a ship or the like by superimposing on the weather map.

With the configuration in JP2004-258020A, there have been cases where, when the meteorological and hydrographic information is acquired from a number of observed locations, information displayed on a nautical chart becomes messy and it is difficult to efficiently obtain the information truly desired by an operator. Moreover, also in JP1993-240963A, since the location of the ship is displayed in the weather map, there have been cases where confusion is caused because of the excessive amount of information. Therefore, it has been desired to improve such conventional configurations in view of tidily displaying the meteorological and hydrographic information.

SUMMARY OF THE INVENTION

The present invention is made in view of the above situations, and provides a situation display device which provides information regarding meteorological and hydrographic phenomena to an operator in a manner that the information can easily be understood.

One aspect of the invention provides a situation display device. The device includes an observation data acquiring module configured to acquire observation data obtained by observing at least one of meteorological phenomena and hydrographic phenomena, along with information of observed locations of the observation data. The device also includes a data selecting module configured to select the observation data obtained at the observed location that is within a predetermined range from a set course of the device. The device also includes a display unit configured to display, when a display screen is oriented vertically, on a bottom side of the display screen, a location of the device with respect to the course, and display the course linearly such that a traveling direction thereof extends upward from the bottom side. The display unit displays, in an upward tapering shape, an area having a predetermined range from the course to a perpendicular direction to the course, and displays the selected observation data at a position on the display screen that indicates a relation between the course and the observed location of the selected observation data, the displayed position of the device in the perpendicular direction being corresponding to an offset amount of the location of the device from the course.

Thus, the observation data of meteorological phenomena and/or the like is displayed while the situation around the device is displayed in a three-dimensional graphic from a viewpoint looking to the end side of the course from the start side thereof, and moreover, the display position of the observation data corresponds to the observed location with respect to the course. Therefore, when the device is installed in a ship, an operator of the device can instinctively grasp the actual location of the ship based on the relation of the device with the set course, and can easily and instinctively understand contents of the observation data of a location important in steering the ship, along with the relation between the course and the observed location. Note that, the display screen is not limited to be oriented vertically, and when the display screen is oriented in other direction, for example, horizontally, the configuration in this aspect can similarly be applied.

Among a plurality of display positions set in advance, the display unit is preferred to select a display position that corresponds closest to the relation between the course and the observed location of the selected observation data, and the display unit is preferred to display the observation data at the selected display position.

Thus, the display positions of the observation data obtained by observing the meteorological phenomena and/or the like are limited, and therefore, simplification of the design of the display screen and load reduction in the display processing are achieved.

The display unit is preferred to display the observation data of which the observed location is close to the device larger than the observation data of which the observed location is far from the device.

Thus, the perspective can be expressed, and therefore, the operator of the device can instinctively understand the observation data.

The display unit is preferred to display the observation data with a symbol, and when the symbol is selected on the display screen, the display unit is preferred to display a detail of the observation data.

Thus, while the information of the observation data is normally provided on the display screen with simple design, when requested, the detail of the observation data can also be provided.

The observation data acquiring module is preferred to acquire the observation data along with an observed timing thereof. The display unit is preferred to visually change a display mode of the observation data according to an elapsed time length from the observed timing.

Thus, the operator of the device can examine the observation data while considering the freshness of the information.

The set course of the device may be a course to a set waypoint.

In this case, the operator of the device can easily understand, with reference to the observation data, whether the ship is traveling straight toward the set waypoint.

The set course of the device may be a course to a set azimuth.

In this case, the operator of the device can easily understand, with reference to the observation data, whether the ship is traveling straight toward the set azimuth.

Another aspect of the invention provides a situation display program. The program causes a situation display device that is configured to display a situation around the device, to acquire observation data obtained by observing at least one of meteorological phenomena and hydrographic phenomena, along with information of observed locations of the observation data. The program also causes the situation display device to select the observation data obtained at the observed location that is within a predetermined range from a set course of the device. The program also causes the situation display device to display, when a display screen is oriented vertically, on a bottom side of the display screen, a location of the device with respect to the course, and display the course linearly such that a traveling direction thereof extends upward from the bottom side. An area having a predetermined range from the course to a perpendicular direction to the course is displayed in an upward tapering shape, and the selected observation data is displayed at a position on the display screen that indicates a relation between the course and the observed location of the selected observation data, the displayed position of the device in the perpendicular direction being corresponding to an offset amount of the location of the device from the course.

Thus, the observation data of meteorological phenomena and/or the like is displayed while the situation around the device is displayed in a three-dimensional graphic from a viewpoint looking to the end side of the course from the start side thereof, and moreover, the display position of the observation data corresponds to the observed location with respect to the course. Therefore, when the device is installed in a ship, an operator of the device can instinctively grasp the actual location of the ship based on the relation of the device with the set course, and can easily and instinctively understand contents of the observation data of a location important in steering the ship, along with the relation between the course and the observed location. Note that, the display screen is not limited to be oriented vertically, and when the display screen is oriented in other direction, for example, horizontally, the configuration in this aspect can similarly be applied.

Further another aspect of the invention provides a method of displaying a situation around a situation display device. The method includes acquiring observation data obtained by observing at least one of meteorological phenomena and hydrographic phenomena, along with information of observed locations of the observation data. The method also includes selecting the observation data obtained at the observed location that is within a predetermined range from a set course of the device. The method also includes displaying, when a display screen is oriented vertically, on a bottom side of the display screen, a location of the device with respect to the course, and displaying the course linearly such that a traveling direction thereof extends upward from the bottom side. An area having a predetermined range from the course to a perpendicular direction to the course is displayed in an upward tapering shape, and the selected observation data is displayed at a position on the display screen that indicates a relation between the course and the observed location of the selected observation data, the displayed position of the device in the perpendicular direction being corresponding to an offset amount of the location of the device from the course.

Thus, the observation data of meteorological phenomena and/or the like is displayed while the situation around the device is displayed in a three-dimensional graphic from a viewpoint looking to the end side of the course from the start side thereof, and moreover, the display position of the observation data corresponds to the observed location with respect to the course. Therefore, when the device is installed in a ship, an operator of the device can instinctively grasp the actual location of the ship based on the relation of the device with the set course, and can easily and instinctively understand contents of the observation data of a location important in steering the ship, along with the relation between the course and the observed location. Note that, the display screen is not limited to be oriented vertically, and when the display screen is oriented in other direction, for example, horizontally, the configuration in this aspect can similarly be applied.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Next, one embodiment of the present invention is described with reference to the accompanying drawings.

Figure 1:
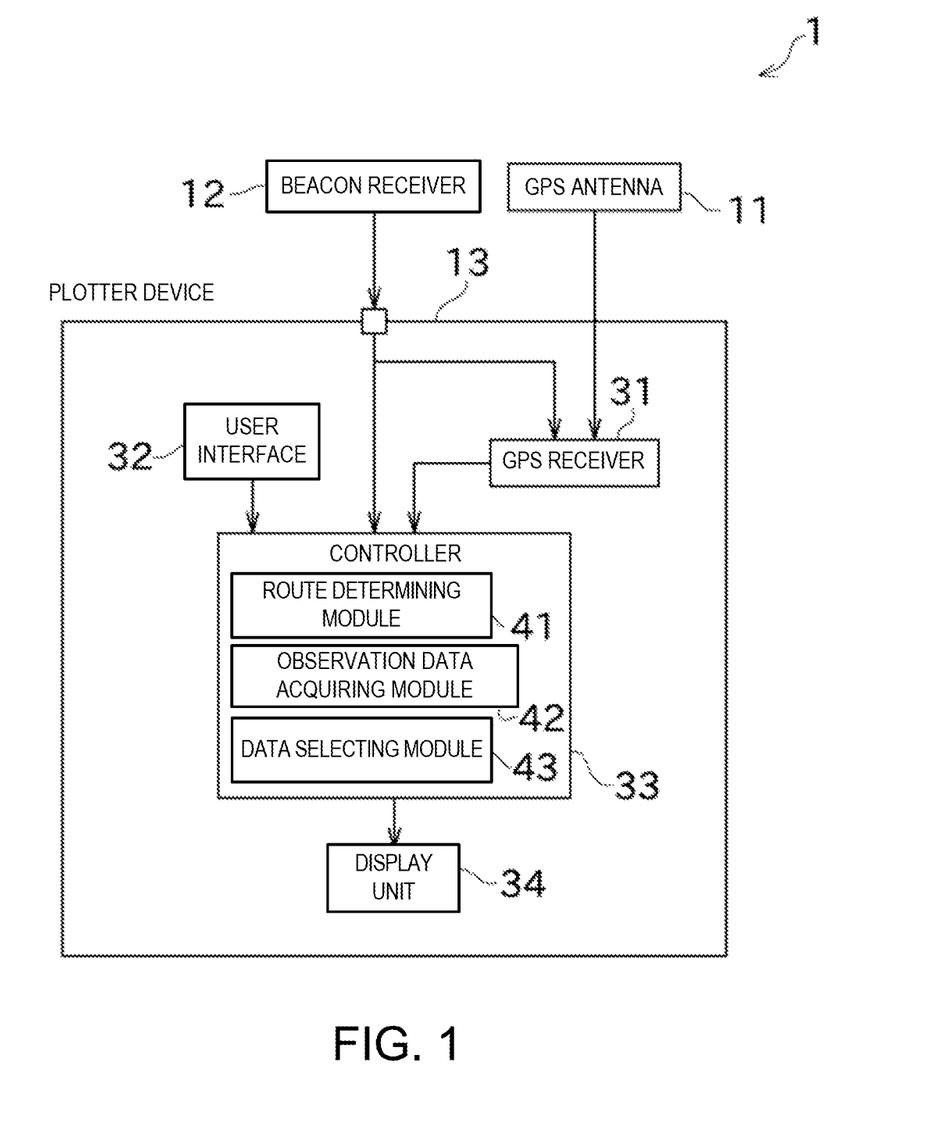
FIG. 1 is a block diagram illustrating a configuration of a navigation apparatus including a plotter device according to one embodiment of the present invention.

FIG. 1 illustrates a functional configuration of a navigation apparatus 1 including a plotter device 13 as a situation display device of this embodiment. The navigation apparatus 1 is equipped in a ship (movable body) and includes a GPS antenna 11 (GNSS antenna), a beacon receiver 12, and the plotter device 13.

The GPS antenna 11 is, for example, a planar antenna such as a micro strip antenna, and receives radio waves in a 1.5 GHz band which are transmitted from GPS satellites. The signals are inputted to the plotter device 13.

Here, the beacon receiver 12 receives a DGPS beacon signal transmitted from a reference station close to the ship (the situation display device), via a middle wave antenna (not illustrated). By analyzing the DGPS beacon signal according to RTCM-104 described above, the beacon receiver 12 acquires observation data regarding meteorological and hydrographic phenomena obtained at a plurality of observed locations (six locations at maximum) close to the reference station (hereinafter, may simply be referred to as the "observation data") in addition to correcting information provided from the reference station and information regarding the operation of the GPS system. The data to be observed is, specifically, a wind direction, a wind speed, an atmospheric pressure, and a wave height (note that, the atmospheric pressure and the wave height may be not measured depending on the observed location), and the names of the observed locations and observed timings are also recorded. The beacon receiver 12 outputs the acquired correcting information to the plotter device 13 and also outputs the observation data to the plotter device 13 along with the information of the names of the observed locations and the observed timings.

The plotter device 13 mainly includes a GPS receiver 31, a user interface 32, a controller 33, and a display unit 34.

The GPS receiver 31 receives positioning signals from the GPS antenna 11 connected to the plotter device 13, to acquire a current location of the ship. Note that, the positioning result is corrected based on the GPS correcting signal inputted from the beacon receiver 12 (the detailed description of the method of the correction of the positioning result is omitted since it is a method well-known as DGPS). Thus, a positioning result more accurate than that obtained by only the GPS positioning can be obtained; therefore, an operator can accurately direct the ship to a target location, such as a fishing ground.

The user interface 32 is comprised of a key and/or a button, and is used for inputting various settings of the plotter device 13. The operator controls the user interface 32 to input waypoints, such as a final destination of the ship and a stopover (intermediate destination) on the way to the final destination. Moreover, the operator controls a cursor on a display screen of the display unit 34 by using the user interface 32, to select a mark or the like which appears on the display screen.

The controller 33 is comprised of hardware, such as a CPU, a ROM and a RAM (not illustrated), and various kinds of software, such as a route determining program and a situation display program stored in the ROM. The situation display program stored in the ROM achieves a situation displaying method in the claim with the plotter device 13, and includes an observation data acquiring step which achieves an observation data acquiring process, and a data selecting step which achieves an observation data acquiring process. The hardware and the various kinds of software allow the controller 33 to function as a route determining module 41, an observation data acquiring module 42, and a data selecting module 43 illustrated in FIG. 1 by cooperating with each other.

When the waypoints are set by the user interface 32, the route determining module 41 determines a scheduled traveling route where the ship is to travel (hereinafter, may be referred to as the course) based on the waypoints. The course is determined by connecting a current location with the waypoints with a straight line or, when a location exists on the way where the ship cannot travel through (e.g., an island), with a line drawn such as to avoid that location. The determined course is displayed on the display unit 34.

The observation data acquiring module 42 acquires the observation data inputted from the beacon receiver 12 along with the information of the observed locations and the observed timings. The processing performed by the observation data acquiring module 42 corresponds to the observation data acquiring step and the observation data acquiring process of the present invention.

The data selecting module 43 selects observation data to be displayed in a highway screen (described later), based on the course determined by the route determining module 41 and the information of the observed locations of the observation data acquired by the observation data acquiring module 42. The processing performed by the data selecting module 43 corresponds to the data selecting step and the data selecting process of the present invention.

Hereinafter, description is given about the display unit 34. The display unit 34 is configured as, for example, a liquid-crystal display. Contents displayed on the display unit 34 are controlled by the controller 33 where the situation display program described above is operated.

Note that, hereinafter, the contents displayed on the display unit 34 are described in a case where the display screen is oriented vertically. However, without limiting to this, even when the display screen is oriented in other direction, for example, horizontally, the configuration disclosed herein can similarly be applied.

The display unit 34 graphically displays the location of the ship on either one of a map and a nautical chart based on the information of the current location of the ship acquired from the GPS receiver 31 (plotter screen mode).

Figure 2:
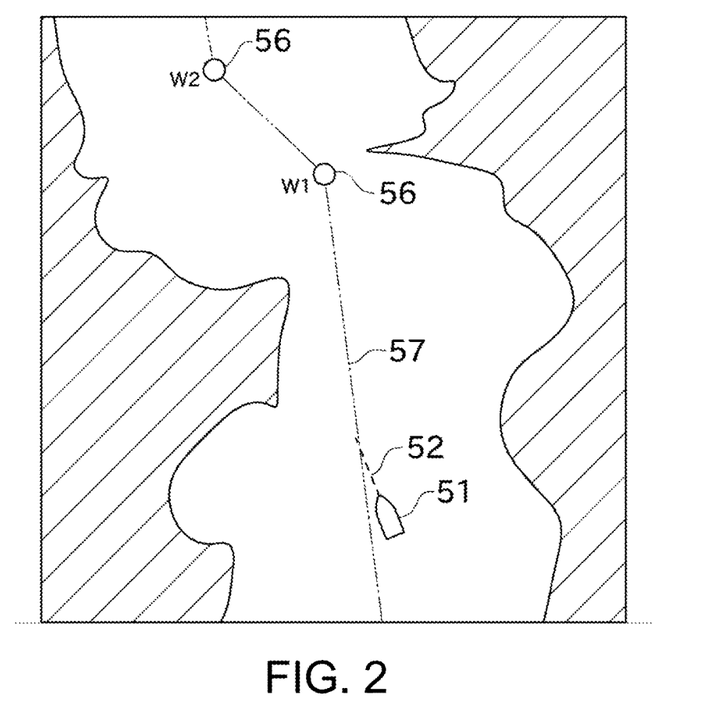
FIG. 2 is a view illustrating an example of a plotter screen displayed by the plotter device.

FIG. 2 illustrates one example of contents displayed on the display unit 34 in the plotter screen mode. In this mode, either one of a map and a nautical chart stored in the plotter device 13 is displayed, and destination marks 56 indicating the set waypoints and a route line 57 indicating the course to the intermediate and final destinations are displayed on the map or the nautical chart. Moreover, the current location of the ship and a heading of the ship are respectively displayed as a boat icon 51 and a heading line 52 by being superimposed on the map or the nautical chart. The set waypoints are denoted with numbers indicating an order that the ship passes therethrough or reaches thereto, and the numbers are displayed near the destination marks 56. In this embodiment, although "Wn" is displayed to indicate the number of the n-th waypoint in the order, the display form is not limited to this. Note that, although it is not illustrated in FIG. 2, in the plotter screen mode, an estimated traveling direction of the ship, a track of the ship and the like may be displayed in addition to the contents described above.

Other than the plotter screen mode described above, when the waypoints described above are set, the plotter device 13 may shift the screen mode to a so-called highway screen mode by the operation of the user interface 32. In the highway screen mode, the display unit 34, instead of displaying one of the map and the nautical chart, displays the location of the ship in a simple three-dimensional graphic from a viewpoint looking to the end side (the destination side) of the course from the start side. The operator can instinctively grasp the actual location of the ship based on the relation of the ship with the course by looking at the highway screen. Note that, the operation performed by the display unit 34 in the highway screen described above corresponds to the displaying step and the displaying process of the present invention.

Figure 3:
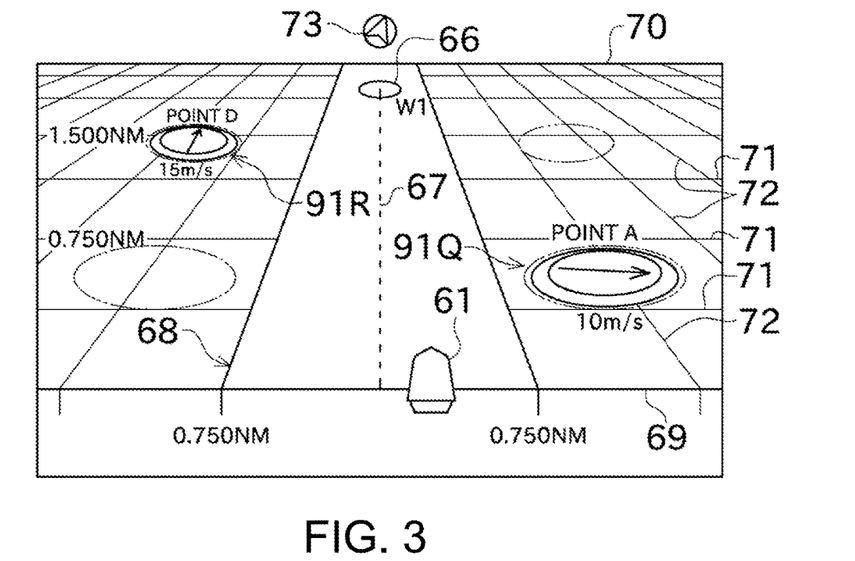
FIG. 3 is a view illustrating an example of a highway screen displayed by the plotter device, in which observation data display parts are displayed and waypoints are set.

FIG. 3 illustrates one example of contents displayed on the display unit 34 in the highway screen mode. A first reference line 69 extending in left-and-right directions is displayed in a low part of the highway screen, and a second reference line 70 extending in the left-and-right directions is displayed above the first reference line 69.

Both the first and second reference lines 69 and 70 are oriented in the horizontal direction and arranged in parallel to each other. Moreover, on the left and right sides of an allowed off-course area 68 (described later), a plurality of horizontal straight lines 71 are drawn between the first and second reference lines 69 and 70. The horizontal straight lines 71 are arranged such that a space between the adjacent horizontal straight lines 71 is narrower toward the second reference line 70.

Between the first and second reference lines 69 and 70, a horizontal-oval-shaped destination mark 66 indicating the waypoint is displayed at a position closer to the second reference line 70 than to the first reference line 69. The destination mark 66 indicates the next waypoint which the ship should travel to (first waypoint), and the number of the destination mark 66 in the order is displayed as "W1." Moreover, a route line 67 indicating the set course (corresponding to the scheduled traveling route of the ship) is displayed in the form of an up-and-down broken straight line extending upward (to the traveling direction of the course) from the first reference line 69 (ship location) which is in the low part of the screen, to the destination mark 66 (waypoint). Moreover, a north pointing mark 73 pointing north in relation to the route line 67 is displayed above the second reference line 70. With the north pointing mark 73, the operator can easily know which azimuth the route line 67 (course) is actually directing.

Between the first and second reference lines 69 and 70, the allowed off-course area 68 centering on the route line 67 described above is displayed in a trapezoid-like shape which is wider in its lower side (the side of the first reference line 69, the side closer to the ship) and narrower in its upper side (the side of the second reference line 70, the traveling direction side of the course, the side closer to the waypoint). The allowed off-course area 68 illustrates an offset width (allowed offset width) set by the operator in advance as a rough indication of how much the ship is allowed to be off from the course. Once the actual ship location goes off the course by more than the allowed offset width, the controller 33 displays an alert for going off-course on the display unit 34 to urge the operator to take an action. In the display example of FIG. 3, the allowed offset width is set to 0.750 nautical miles, which is displayed at left and right ends of a bottom side of the allowed off-course area 68 formed in the trapezoid-like shape.

On the left and right sides of the allowed off-course area 68 described above, a plurality of radial straight lines 72 are drawn between the first and second reference lines 69 and 70. The straight lines 72 intersect with the horizontal straight lines 71 described above.

A horizontal plane parallel to the ground surface or the water surface is illustrated in perspective where the distant view is illustrated in the upper part of the display screen and the near view is illustrated in the lower part thereof.

Moreover, by displaying the destination mark 66, the route line 67, and the allowed off-course area 68 on the horizontal plane, and displaying a ship mark 61 as the ship location at a position on the near view side (in the lower part), the illustration of as if looking down the ship traveling on a wide street is achieved. As described above, in the highway screen, the ship location can be displayed following the operator's point of view to some extent. Thus, the operator can grasp more instinctively the situation of whether the ship is traveling along the course, for example.

The displayed position of the ship mark 61 is changed leftward or rightward in relation to the route line 67 displayed in the highway screen, according to how much the ship location is off the course. Specifically, when the ship is right on the course, the ship mark 61 is displayed at the center in the left-and-right directions (at the position where the first reference line 69 intersects with the route line 67). On the other hand, when the ship is, for example, off the course to the right with respect to the traveling direction by the allowed offset width described above, the ship mark 61 is displayed at a right end position of the bottom side of the allowed off-course area 68. Note that, FIG. 3 illustrates the display example in the case where the ship location is slightly off the course to the right with respect to the traveling direction. Therefore, by confirming the position of the ship mark 61, the operator can easily understand how off the ship location is from the course and which direction the ship location is off to, and whether the offset amount is allowable.

As illustrated in FIG. 3, between the first and second reference lines 69 and 70, observation data display parts 91Q and 91R each indicating a wind direction and a wind speed are displayed on the left and right sides of the allowed off-course area 68. Among the observation data supplied by the DGPS beacon signal, the observation data display parts 91Q and 91R illustrate observation data of the observed locations close to the course of the ship.

Each of the observation data display parts 91Q and 91R includes a symbol formed with a horizontal oval frame and an arrow arranged inside the frame. Each of the observation data display parts 91Q and 91R graphically illustrates the wind direction by the arrow. Since the arrow in each of the observation data display parts 91Q and 91R indicates a relative wind direction with respect to the azimuth to which the route line 67 is oriented, the operator can instinctively understand the wind direction in relation to the course. The name of the observed location is displayed above the symbol and the wind speed is displayed below the symbol in a numerical value. Note that, although the name of the observed location is expressed as, for example, "POINT A" (indicating an observed location A) in FIG. 3 and the like for the sake of convenience of explanation, actually, a specific name of a location written in the type 16 message (e.g., when the location is Ezaki Beacon, "EZAKI") is displayed as it is.

Next, processing in which the data selecting module 43 selects observation data to be displayed as the observation data display parts 91Q and 91R in the highway screen as described above is described in detail.

Figure 4:
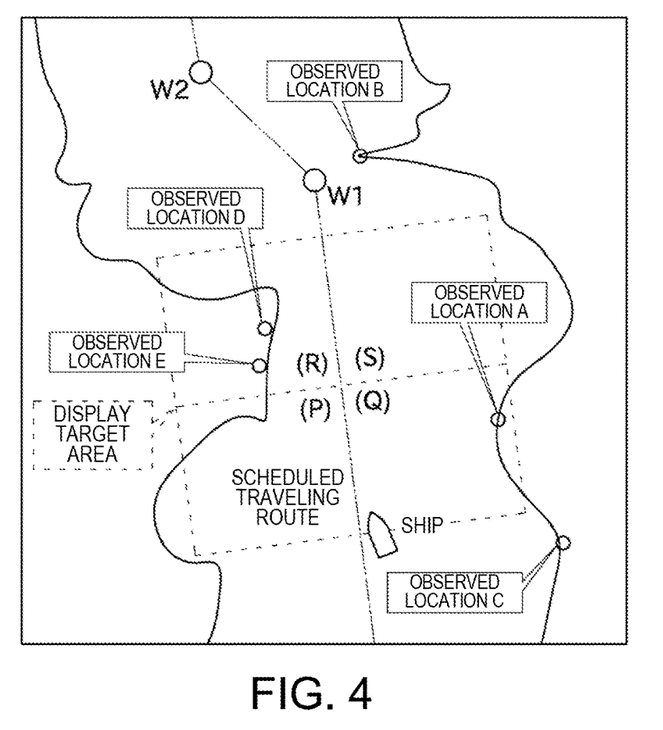
FIG. 4 is a view for describing processing of selecting observation data based on a observed location thereof.

A case is described in which observation data of five observed locations A to E illustrated in FIG. 4 is written in the type 16 message in the DGPS beacon signal received by the beacon receiver 12 of the ship. Note that, although the positional information of the observed locations A to E written in the type 16 message only includes the names, since the plotter device 13 has a database (not illustrated) storing correspondence relation of the names of the observed locations with the latitude and the longitude, the data selecting module 43 of the controller 33 can acquire the latitudes and the longitudes of the observed locations.

Next, the data selecting module 43 draws a line segment of a predetermined distance on the part of the set course where the ship has not yet traveled through, and virtually sets a rectangular area having a predetermined range from the line segment to a direction perpendicular to the line segment (display target area illustrated in FIG. 4). Then, the data selecting module 43 divides the display target area into four areas: (P) which is on the left side of the course with respect to the traveling direction and relatively close to the ship; (Q) which is on the right side of the course with respect to the traveling direction and relatively close to the ship; (R) which is on the left side of the course with respect to the traveling direction and relatively far from the ship; and (S) which is on the right side of the course with respect to the traveling direction and relatively far from the ship. Then the data selecting module 43 determines whether the respective observed locations of the observation data described above are within the respective partitioned areas.

When the observed location(s) are within any of the partitioned areas, the data selecting module 43 selects the observation data of the observed location(s) to be displayed in the highway screen. Note that, when two or more of the observed locations are in a single partitioned area, the closest observed location to the center of the partitioned area is selected and the observation data of that observed location is selected to be displayed in the highway screen.

In the example of FIG. 4, the observed location A is within the area (Q) and the observed locations D and E are within the area (R), and the observed location D is closer to the center of the area (R) than the observed location E. Therefore, the data selecting module 43 selects the observation data of the observed locations A and D to be displayed in the highway screen. As a result, in the highway screen of FIG. 3, the observation data of the observed location A is displayed as the observation data display part 91Q and the observation data of the observed location D is displayed as the observation data display part 91R.

As described above, the data selecting module 43, with reference to the current location of the ship and location(s) thereof to be (the course), selects the observation data of the observed location(s) considered as important in geographical view, and excludes the observation data which is not selected, from the display target. Thus, it can be such that only the selected observation data is displayed for the operator. Therefore, the operator can efficiently acquire the information regarding meteorological phenomena and the like in a region which is highly relevant to the steering of the ship.

Note that, the positions of the observation data display parts to be displayed in the highway screen are determined in advance to four positions indicated by the chain lines in FIG. 3, and among the four positions, the observation data of each observed location existing within the display target area described above is displayed at a position corresponding the closest to the relation of the observed location with the course. Specifically, the four displayed positions for the observation data display parts indicated by the chain lines in FIG. 3 correspond to the four partitioned areas formed by dividing the display target area. Further, the partitioned areas (P) to (S) described above and the positions for the observation data display parts to be displayed in the highway screen are in correspondence relation of one area for one part.

More specifically, the observation data in the area (P) which is on the left side of the course with respect to the traveling direction and relatively close to the ship is displayed at a position on the left side of the route line 67 in the lower part (on the side close to the ship, on the near view side) of the highway screen in FIG. 3. The observation data in the area (Q) which is on the right side of the course with respect to the traveling direction and relatively close to the ship is, as illustrated in the observation data display part 91Q in the highway screen of FIG. 3, displayed at a position on the right side of the route line 67 in the lower part (on the side close to the ship, on the near view side) of the highway screen. The observation data in the area (R) which is on the left side of the course with respect to the traveling direction and relatively far from the ship is, as illustrated in the observation data display part 91R in the highway screen of FIG. 3, displayed at a position on the left side of the route line 67 in the upper part (on the side far from the ship, on the distant view side) of the highway screen. The observation data in the area (S) which is on the right side of the course with respect to the traveling direction and relatively far from the ship is displayed at a position on the right side of the route line 67 in the upper part (on the side far from the ship, on the distant view side) of the highway screen in FIG. 3.

As described above, in this embodiment, the displayed positions for the observation data display parts are restricted to four positions at maximum due to the positional relation with the traveling course. Therefore, a highway screen as FIG. 3 in which the information regarding the meteorological and hydrographic phenomena is displayed intensively in a simple form can be provided.

Note that, although the positions where the observation data can be displayed in the highway screen are limited to four positions due to the relation between the ship and the course as described above, this does not mean that the position where the observation data is displayed in the highway screen necessarily reflects the exact location of the observed location. Since the meteorological and hydrographic phenomena mostly change over a wide area to some extent, in many cases, the exact observed location of the meteorological phenomena is not a great concern to the operator, and the operator is satisfied as long as substantial geographical relation of the traveling ship with the meteorological phenomena can be grasped. In this regard, in this embodiment, since the displayed positions of the observation data are limited as described above, simplification of the configuration of the display screen and load reduction in display processing are achieved while providing sufficient information to the operator. Moreover, since the displayed position of the observation data does not vary finely according to the steering of the ship, the operator can concentrate on steering the ship without being influenced unnecessarily by the display of the observation data.

Moreover, as illustrated in FIG. 3, the observation data display parts 91Q and 91R are displayed smaller as the observed location thereof is farther from the ship. Thus, the display of the information matching the perspective of the highway screen described above is achieved, and the operator can instinctively understand the information of the meteorological phenomena and the like in relation to the course of the ship.

Figure 5:
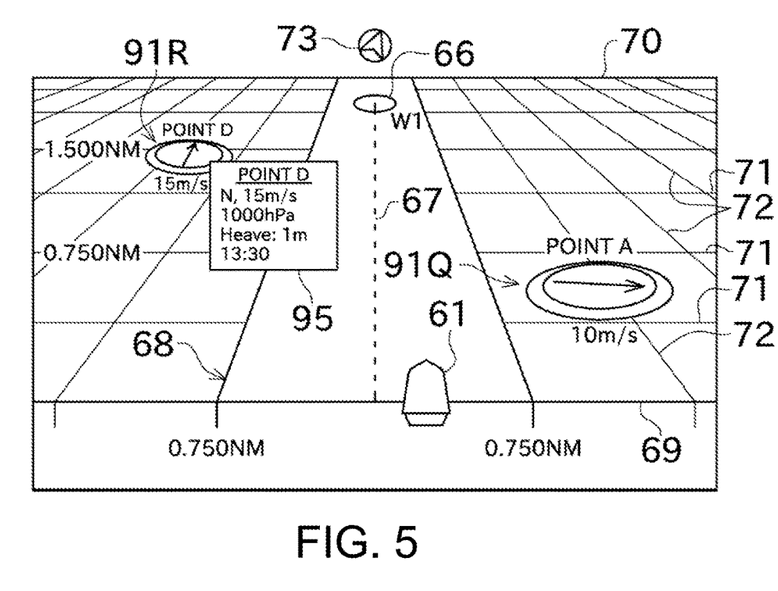
FIG. 5 is a view illustrating a state in which details of the observation data are displayed in a popup screen.

In the highway screen of FIG. 3, each of the observation data display parts 91Q and 91R includes the name of the observed location, the symbol (the oval frame and the arrow) graphically illustrating the wind direction, and the numerical value of the wind speed, and does not include any other information (simplified display). On the other hand, when the operator controls the user interface 32 to bring the cursor on the symbol of one of the observation data display parts 91Q and 91R and select the symbol, the display unit 34 displays the details of the observation data in a popup screen. FIG. 5 illustrates an example in which the symbol of the observation data display part 91R is selected and a popup screen 95 is displayed. In the popup screen 95, other than the wind direction and the wind speed, the atmospheric pressure, the wave height, and the observed timing are specifically displayed with characters (e.g., letters and numbers). Thus, normally the meteorological/hydrographic information is displayed on a display screen with a simple configuration, and the detailed pinpoint meteorological/hydrographic information can be provided in response to the request from the operator.

The display of the observation data display parts 91Q and 91R may be visually changed according to the observed timing of the corresponding meteorological/hydrographic information. For example, it may be considered to display the data obtained at the latest observed timing in darker color in gray scale and display the old data in lighter color in gray scale. Alternatively, it may be such that, about the data observed within a few minutes from a current time point, a mark may be displayed denoted to the data to indicate that it is new (e.g., the "New" mark). Thus, the operator can examine the observation data while considering how fresh the information is.

Figure 6:
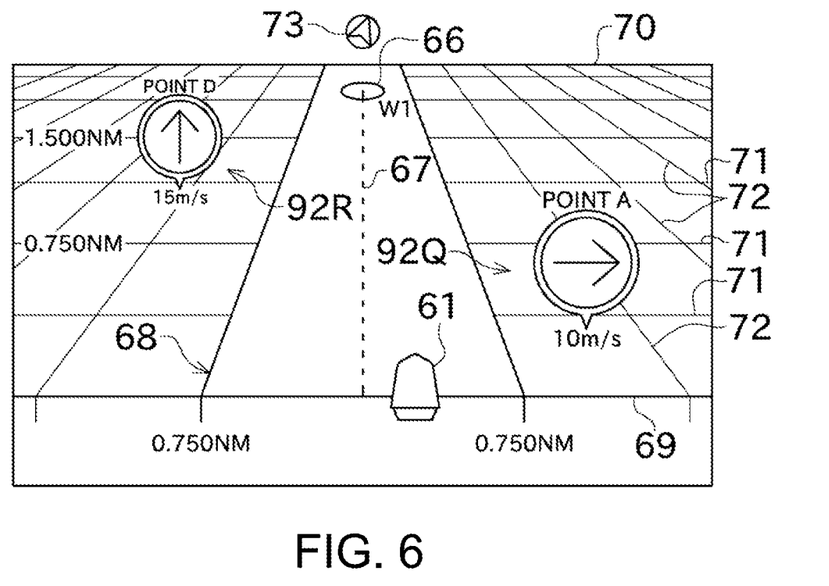
FIG. 6 is a view illustrating another display example of the observation data display parts.

Note that, the symbols of the observation data display parts are not limited to those symbols of the reference numerals 91Q and 91R in FIG. 3, and may also be, for example, vertical-balloon-shaped symbols as those symbols of the reference numerals 92Q and 92R in a modified example of FIG. 6. This configuration is advantageous in view of improving the visibility of the arrow indicating the wind direction. In this case, the observation data display parts 92Q and 92R may be displayed such that the arrows indicating the wind direction are oriented with respect to the direction of the course or with respect to north.

Figure 7:
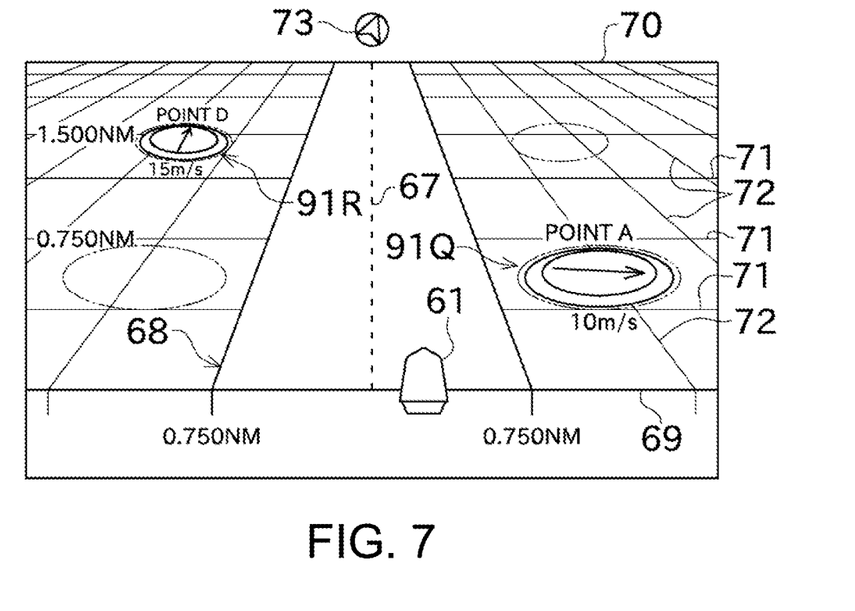
FIG. 7 is a view illustrating a display example when an azimuth is set instead of the waypoints.

Note that, in FIG. 3, the example of the highway screen in which the waypoints are set is illustrated; however, even when an azimuth to which the ship is to travel is set instead of the waypoints, the display unit 34 can display the highway screen similar to the highway screen in FIG. 3. In other words, by the operator controlling the user interface 32 to input a desired azimuth to which the ship is to travel, the route determining module 41 determines a traveling route of the ship (the scheduled traveling route, the course) as the straight line orienting to the specified azimuth starting from the ship location at the operating time point. FIG. 7 illustrates a display example of the highway screen displayed by the display unit 34 in this case. In the display example of FIG. 7, since the waypoints are not set, the destination mark 66 is not displayed. Moreover, the route line 67 indicating the course is illustrated such that the ship location is in the lower part of the display screen and the traveling direction of the course is oriented upward of the display screen, and the allowed off-course area 68 described above is displayed centering on the route line 67. Further, the displayed position of the ship mark 61 varies leftward or rightward in relation to the route line 67 according to the above-described offset amount of the ship from the course. With the highway screen, the operator can easily confirm whether the ship is traveling straight to the intended azimuth.

In the case of FIG. 7, the data selecting module 43 draws a line segment along the course, sets the display target area as a rectangular area having a predetermined range from the line segment to the direction perpendicular to the line segment, and selects the observation data of the observed locations within the display target area. Then the display unit 34 displays the selected observation data as the observation data display parts 91Q and 91R.

Although the preferred embodiment of the present invention and the modified example thereof are described above, the above configurations may be modified as follows, for example.

The display unit 34, instead of displaying the wind direction and the wind speed as the observation data display parts 91Q and 91R, may be modified to display arbitrary meteorological information or arbitrary hydrographic information (e.g., the atmospheric pressure or the wave height) by using graphical symbols, such as icons.

Regarding the selecting method of the observation data by the data selecting module 43, various methods may be adopted without being limited to the method of setting the display target area as illustrated in FIG. 4. For example, the data selecting module 43 may obtain a point which bisects the line segment corresponding to the part of the set course where the ship has not yet traveled through, and then select the observation data of the observed location(s) which are within a predetermined distance from the bisecting point.

Instead of displaying the four observation data display parts as FIG. 3, it may be modified such that two or six observation data display parts are displayed, for example. Note that, in the above embodiment, the maximum number of the observed locations of the observation data transmitted by the type 16 message is six; however, by configuring to receive a DGPS beacon signal from another reference station in addition to that from the reference station with which the DGPS correction is actually operated (dual frequency receiving function), observation data of a larger number of observed locations can be acquired.

The highway screen is not limited to the display in the example of FIG. 3 and may be modified variously. For example, the allowed off-course area 68 may be displayed, instead of in the trapezoid-like shape, but in a triangle shape pointing upward. Moreover, the horizontal straight lines 71 and/or the radial straight lines 72 may be omitted from the horizontal plane illustrated in the highway screen.

In the highway screen, the route line 67 may be displayed in a solid line instead of the broken line, and/or the display of the north pointing mark 73 may be omitted. Moreover, a ratio of the part of the course which the ship has traveled, with respect to the course, may be additionally displayed at a suitable position in the highway screen.

The popup screen 95 as illustrated in FIG. 5 is not limited to be displayed by selecting the symbol, and may be displayed by selecting the name of the observed location displayed above the symbol, or selecting the wind speed displayed below the symbol. Moreover, the symbol, the name of the observed location, or the wind speed may be selected by bringing the cursor on the target (e.g., symbol) and performing a so-called click operation, or by only bringing the cursor on the target (on-cursor).

The navigation apparatus 1 of the above embodiment may be applied to, in addition to ships, other movable bodies (e.g., aircrafts).

Note that, the definition of the map includes, not only maps which are created for people, automobiles and the like to travel, but also maps which are created for other movable bodies (e.g., aircrafts) to travel.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A situation display device adapted to be equipped in a ship, the device comprising:
   a controller comprising memory and one or more processors configured to execute:
      an observation data acquiring module configured to acquire observation data obtained by observing a direction and a magnitude of at least one of meteorological phenomena and hydrographic phenomena, along with information of observed locations of the observation data from a beacon receiver and a GPS receiver, wherein the meteorological phenomena and hydrographic phenomena include at least one phenomenon selected from the group consisting of a wind direction, a wind speed, an atmospheric pressure, and a wave height; and
      a data selecting module configured to select the observation data obtained at the observed location that is within a predetermined range from a set course of the device; and
   a display unit configured to display, when a display screen is oriented vertically, on a bottom side of the display screen, a three-dimensional graphic with a location of the device with respect to the course, and display the course linearly such that a traveling direction thereof extends upward from the bottom side,
   wherein the display unit displays, in an upward tapering shape, an area having a predetermined range from the course to a perpendicular direction to the course, and displays the selected observation data as an observation data display part at a position on the display screen that indicates a relationship between the course and the observed location of the selected observation data, the displayed position of the device in the perpendicular direction being corresponding to an offset amount of the location of the device from the course, and the observation data display part including a visually distinguishable symbol that graphically illustrates the direction and the magnitude of the selected observation data relative to the course; and
   wherein a size of the symbol of the observation data display part with respect to the direction and the magnitude is adjusted according to the observed location on the display screen.

2. The device of claim 1, wherein among a plurality of display positions set in advance, the display unit selects a display position with a relative relationship to the course that corresponds closest to a relationship between the course and the observed location of the selected observation data, and the display unit displays the observation data at the selected display position.

3. The device of claim 1, wherein the display unit displays the observation data of which the observed location is close to the device larger than the observation data of which the observed location is far from the device.

4. The device of claim 1, wherein when the symbol is selected on the display screen, the display unit displays a detail of the observation data.

5. The device of claim 1, wherein the observation data acquiring module acquires the observation data along with an observed timing thereof, and
   wherein the display unit visually changes a display mode of the observation data according to an elapsed time length from the observed timing.

6. The device of claim 1, wherein the set course of the device is a course to a set waypoint.

7. The device of claim 1, wherein the set course of the device is a course to a set azimuth.

8. Computer readable media configured to store a computer executable program in a non-transitory manner, which upon execution by a processor of a computer causes the computer to display a situation around a situation display device adapted to be equipped in a ship, the program comprising:
   causing a computer to acquire observation data obtained by observing a direction and a magnitude of at least one of meteorological phenomena and hydrographic phenomena, along with information of observed locations of the observation data from a beacon receiver and a GPS receiver, wherein the meteorological phenomena and hydrographic phenomena include at least one phenomenon selected from the group consisting of a wind direction, a wind speed, an atmospheric pressure, and a wave height;
   causing a computer to select the observation data obtained at the observed location that is within a predetermined range from a set course of the device; and
   causing a computer to display, when a display screen is oriented vertically, on a bottom side of the display screen, a three-dimensional graphic with a location of the device with respect to the course, and display the course linearly such that a traveling direction thereof extends upward from the bottom side,
   wherein an area having a predetermined range from the course to a perpendicular direction to the course is displayed in an upward tapering shape, and the selected observation data is displayed as an observation data display part at a position on the display screen that indicates a relationship between the course and the observed location of the selected observation data, the displayed position of the device in the perpendicular direction being corresponding to an offset amount of the location of the device from the course, and the observation data display part including a visually distinguishable symbol graphically illustrating the direction and the magnitude of the selected observation data relative to the course; and wherein a size of the symbol of the observation data display part with respect to the direction and the magnitude is adjusted according to the observed location on the display screen.

9. A method of displaying a situation around a situation display device adapted to be equipped in a ship, the method comprising:

acquiring observation data obtained by observing a direction and a magnitude of at least one of meteorological phenomena and hydrographic phenomena, along with information of observed locations of the observation data from a beacon receiver and a GPS receiver, wherein the meteorological phenomena and hydrographic phenomena include at least one phenomenon selected from the group consisting of a wind direction, a wind speed, an atmospheric pressure, and a wave height;

selecting the observation data obtained at the observed location that is within a predetermined range from a set course of the device; and displaying, when a display screen is oriented vertically, on a bottom side of the display screen, a three-dimensional graphic with a location of the device with respect to the course, and displaying the course linearly such that a traveling direction thereof extends upward from the bottom side, wherein an area having a predetermined range from the course to a perpendicular direction to the course is displayed in an upward tapering shape, and the selected observation data is displayed as an observation data display part at a position on the display screen that indicates a relationship between the course and the observed location of the selected observation data, the displayed position of the device in the perpendicular direction being corresponding to an offset amount of the location of the device from the course, and the observation data display part including a visually distinguishable symbol that graphically illustrates the direction and the magnitude of the selected observation data relative to the course; and wherein a size of the symbol of the observation data display part with respect to the direction and the magnitude is adjusted according to the observed location on the display screen.

* * * * *